(12) United States Patent
Yamamoto

(10) Patent No.: US 12,377,817 B2
(45) Date of Patent: Aug. 5, 2025

(54) RANGING DEVICE

(71) Applicant: DENSO CORPORATION, Kariya (JP)

(72) Inventor: Masahiro Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 646 days.

(21) Appl. No.: 17/190,815

(22) Filed: Mar. 3, 2021

(65) Prior Publication Data

US 2021/0188219 A1     Jun. 24, 2021

Related U.S. Application Data

(63) Continuation of application No. PCT/JP2019/034583, filed on Sep. 3, 2019.

(30) Foreign Application Priority Data

Sep. 5, 2018  (JP) .................................. 2018-165989

(51) Int. Cl.
*B60S 1/56*    (2006.01)
*G01S 7/481*   (2006.01)
*G01S 17/931*  (2020.01)

(52) U.S. Cl.
CPC ............... *B60S 1/56* (2013.01); *G01S 7/4811* (2013.01); *G01S 17/931* (2020.01)

(58) Field of Classification Search
CPC ......... G01S 7/4811; G01S 17/931; B60S 1/56
See application file for complete search history.

(56) References Cited

U.S. PATENT DOCUMENTS

| 6,414,623 | B1 | 7/2002 | Ashihara |
| 6,630,901 | B1* | 10/2003 | Winter ...................... H01Q 1/02 |
| | | | 343/873 |
| 10,560,983 | B2* | 2/2020 | Seubert ................. G01S 7/4813 |
| 2014/0320845 | A1 | 10/2014 | Bayha et al. |
| 2016/0230635 | A1* | 8/2016 | Fujie .................. B01D 53/9477 |
| 2018/0208028 | A1* | 7/2018 | Seubert ................. G01S 17/931 |
| 2019/0296074 | A1* | 9/2019 | Kokubun .............. H10F 39/807 |
| 2020/0348397 | A1* | 11/2020 | Yamamoto .............. G01S 7/497 |

FOREIGN PATENT DOCUMENTS

| JP | H08-029535 A | 2/1996 |
| JP | 2767859 B2 | 6/1998 |
| JP | 2006-151285 A | 6/2006 |

OTHER PUBLICATIONS

Yasushi et al., Electrochromic phenomenon in indium-tin-oxide films deposited by RF magnetron sputtering, Mar. 19, 2010, Elsevier, vol. 518, Issue 21, pp. S6-S9 (Year: 2010).*

* cited by examiner

*Primary Examiner* — Wade Miles
*Assistant Examiner* — Aaron G Cain
(74) *Attorney, Agent, or Firm* — Maschoff Brennan

(57) ABSTRACT

A ranging device is configured to emit a transmitted wave and detect a reflected wave from an object illuminated by the transmitted wave, thereby measuring a distance to the object. At least one of the transmitted wave and the reflected wave is transmitted through a transmission window. A heater is configured to heat the transmission window. A controller is configured to control energization of the heater in response to an outside temperature that is a temperature outside the ranging device and a speed of the vehicle.

8 Claims, 10 Drawing Sheets

FIG.6

| OUTSIDE TEMPERATURE / VEHICLE SPEED | 10 — 0°C | 0 — -10°C | -10 — -20°C |
|---|---|---|---|
| 0 — 30 km/h | 2[W] | 4[W] | 6[W] |
| 30 — 70 km/h | 4[W] | 6[W] | 8[W] |
| 70 — 100 km/h | 6[W] | 8[W] | 10[W] |
| 100 km/h — | 8[W] | 10[W] | 12[W] |

RANGING DEVICE

CROSS REFERENCE TO RELATED APPLICATION

This international application claims the benefit of priority from Japanese Patent Application No. 2018-165989 filed with the Japan Patent Office on Sep. 5, 2018, the entire contents of which are incorporated herein by reference.

BACKGROUND

Technical Field

This disclosure relates to a ranging device.

Related Art

There is a ranging device mounted to a vehicle and configured to measure a distance to an object ahead of the vehicle. This ranging device emits transmitted waves forward, detects reflected waves of the emitted transmitted waves from the object, and thereby measures a distance to the object.

BRIEF DESCRIPTION OF THE DRAWINGS

In the accompanying drawings:

FIG. 6 is a table illustrating a relationship between an energization level of a heater, an outside temperature, and a vehicle speed;

DESCRIPTION OF SPECIFIC EMBODIMENTS

In the above ranging device, a cover is provided in front of an emitter that emits transmitted waves or a detector that detects reflected waves to protect the emitter or the detector. However, snow adhering to the cover may decrease the measurement accuracy of the ranging device.

To address this issue, JP-A-1996-29535 describes that the cover of the ringing device is provided with a heater to melt the snow.

As a result of detailed research performed by the present inventors, regarding the ranging device in which the transmission window, though which transmitted waves or reflected waves are transmitted, is provided with a heater, it has been found that an energization level of the heater needed to keep the temperature of the transmission window at a desired temperature significantly differs depending on an outside temperature and a speed of the vehicle. More specifically, when the outside temperature is low, a high energization level is needed because more heat of the transmission window heated by the heater is lost to the outside air as compared with when the outside temperature is high. Even if the outside temperature is fixed, the heat of the transmission window heated by the heater is more rapidly lost when the speed of the vehicle is high as compared with when the speed of the vehicle is low, which needs a high energization level of the heater. Accordingly, if, in order to mitigate the reduction in measurement accuracy of the ranging device, the energization level is set high without exception such that snow adhering to the transmission window can be sufficiently removed under any condition, the transmission window may be unnecessarily heated by the heater, which may lead to increased power consumption by the heater.

In view of the foregoing, it is desired to have a ranging device in which a transmission window is provided with a heater, which enables appropriate control of energization of the heater.

One aspect of this disclosure provides a ranging device to be mounted to a vehicle, which is configured to emit a transmitted wave and detect a reflected wave from an object illuminated by the transmitted wave, thereby measuring a distance to the object. The ranging device includes a transmission window, a heater, and controller. at least one of the transmitted wave and the reflected wave is transmitted through the transmission window. the heater is configured to heat the transmission window. The controller is configured to control energization of the heater in response to an outside temperature that is a temperature outside the ranging device and a speed of the vehicle.

This configuration enables appropriate control of energization of the heater.

Hereinafter, some embodiments of the disclosure will be described with reference to the drawings.

1. FIRST EMBODIMENT 1-1. Configuration

Figure 1:
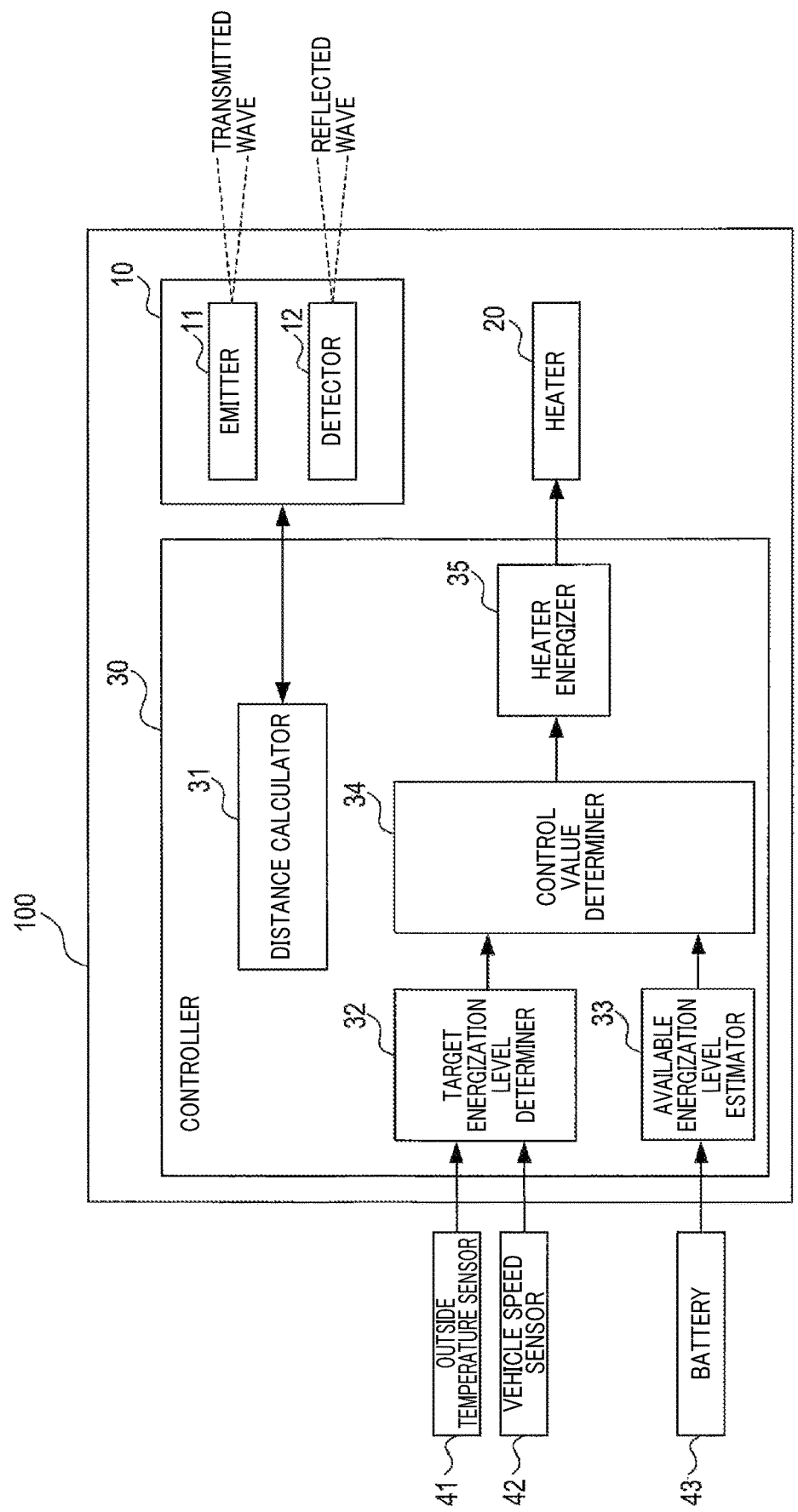
FIG. 1 is a block diagram of a LIDAR device according to a first embodiment.

A LIDAR device 100 illustrated in FIG. 1 is a ranging device configured to emit light as transmitted waves and detect reflected waves from an object irradiated with light, and thereby measure a distance to the object. The term "LIDAR" is an abbreviation for Light Detection and Ranging. The LIDAR device 100 is mounted to a vehicle and used to detect various objects ahead of the vehicle.

The LIDAR device 100 includes a measurer 10, a heater 20, and a controller 30.

The measurer 10 includes an emitter 11 that emits light and a detector 12 that detects reflected waves of the light. The emitter 11 emits laser light as the light. The detector 12 receives the reflected waves from the object and converts the received, reflected waves into electric signals.

Figure 2:
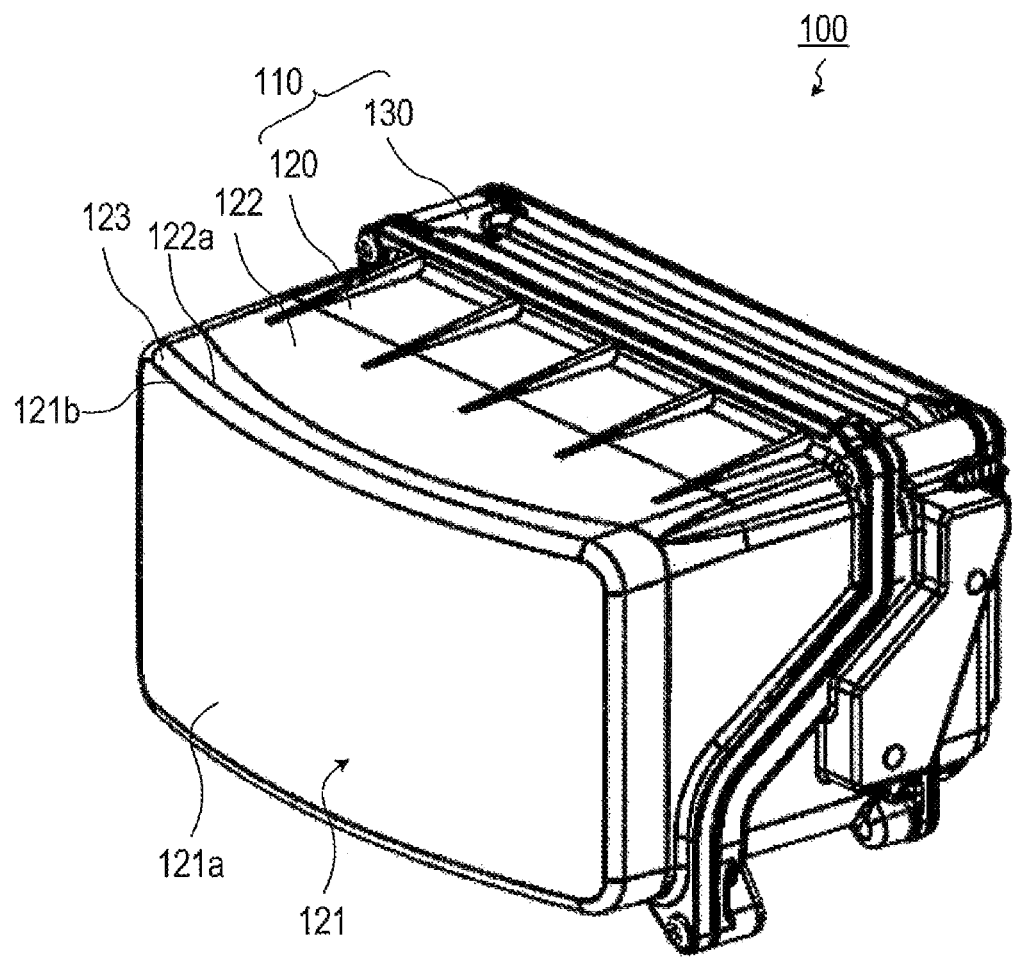
FIG. 2 is a perspective view of the LIDAR device.

The measurer 10 is housed within the case 110 formed of a cover 120 and a case body 130 of the LIDAR device 100 illustrated in FIG. 2. The emitter 11 of the measurer 10 is housed in the upper region of a space inside the case 110. On the other hand, the detector 12 is housed in the lower region of the space inside the case 110.

A transparent transmission window 121 through which light is transmitted is provided as a front portion of the cover 120. As used herein the term "front" means a direction in which light is emitted from the LIDAR device 100. The transmission window 121 provides separation between the interior and the exterior of the LIDAR device 100.

Figure 3:
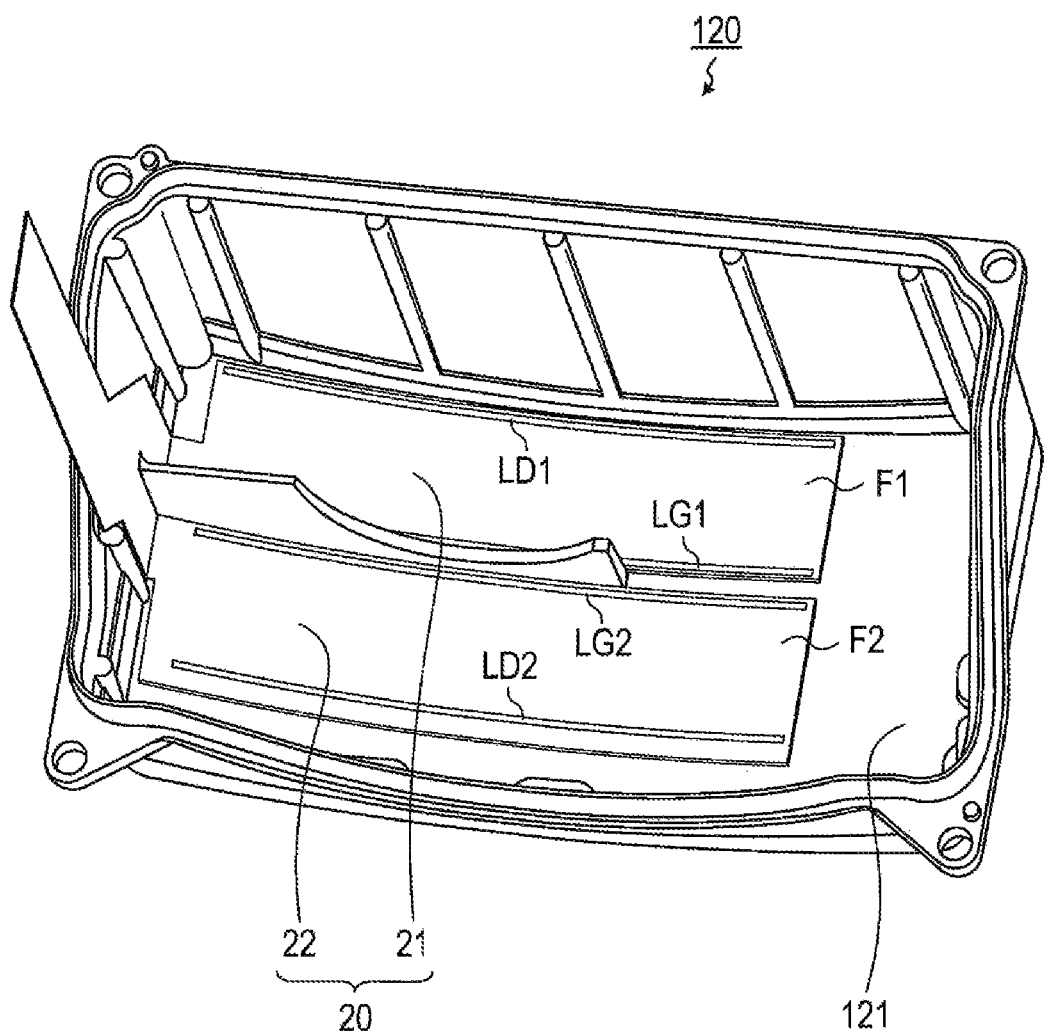
FIG. 3 is an illustration of an inside of a cover of the LIDAR device.

The heater 20 is configured to heat the transmission window 121 from the inside of the LIDAR device 100, that is, from the inner side of the transmission window 121. The heater 20 is provided on the inner surface of the transmission window 121 as illustrated in FIG. 3. The heater 20 includes an emitter-side heater 21 provided on the emitter 11 side of the transmission window 121 and a detector-side heater 22 provided on the detector 12 side of the transmission window 121. Each of the emitter-side heater 21 and the detector-side heater 22 has a transparent conductive film Fi and a pair of electrodes LDi, LGi, where i is 1 when belonging to the emitter-side heater 21 and 2 when belonging to the detector-side heater 22. The transparent conductive film Fi is a heater film formed of a material having transparency and electrical conductivity. For example, an indium tin oxide (ITO) film is used as the transparent conductive film Fi.

The controller 30 may be configured as at least one microcomputer including a central processing unit (CPU), a read-only memory (ROM), a random-access memory (RAM), an input-output interface (I/O), and a bus line connecting these components. The controller 30 includes, as functional blocks implemented by executing programs stored in the ROM, that is, virtual elements, a distance calculator 31, a target energization level determiner 32, an available energization level estimator 33, a control value determiner 34, and a heater energizer 35.

The distance calculator 31 is configured to use the measurer 10 to detect a distance to the object illuminated by the light. More specifically, the distance calculator 31 determines a timing at which a reflected wave is detected based on a waveform of an electrical signal received from the detector 12, and calculates a distance to the object based on a time difference from emission of light. The distance calculator 31 may acquire information about the object, such as an azimuth of the object, in addition to the distance to the object.

The target energization level determiner 32 is configured to determine an energization level of the heater 20 (hereinafter referred to as a target energization level) in response to an outside temperature, which is a temperature outside the LIDAR device 100, and a speed of the vehicle to which the LIDAR device 100 is mounted (hereinafter referred to as a vehicle speed). In the described later process performed by the target energization level determiner 32, energization power per unit of time is acquired as the target energization level of the heater 20. The target energization level determiner 32 acquires the outside temperature from the outside temperature sensor 41 mounted to the vehicle. The outside temperature sensor 41 is provided on the bottom of the vehicle to detect the outside temperature of the vehicle. The target energization level determiner 32 further acquires a vehicle speed from the vehicle speed sensor 42 mounted to the vehicle.

The available energization level estimator 33 is configured to estimate the energization level that the battery 43 can supply (hereinafter, also referred to as an available energization level), based on a detected battery voltage of the battery 43 mounted to the vehicle.

The control value determiner 34 is configured to determine a control value for the heater energizer 35 described later to control energization of the heater 20. In the present embodiment, the control value is a duty cycle, which is a ratio of an energization time to a de-energization time of the heater 20. The control value determiner 34 determines the duty cycle in response to the target energization level determined by the target energization level determiner 32 and the available energization level estimated by the available energization level estimator 33. Since, in the present embodiment, the battery 43 of the vehicle is directly connected to the heater 20 without being connected to the heater 20 through a constant-voltage circuit or the like, the voltage applied to the heater 20 varies with variation of the battery voltage. Therefore, in response to the energization level that the battery 43 can currently supply, the control value determiner 34 determines the duty cycle such that the actual energization level of the heater 20 becomes the target energization level determined by the target energization level determiner 32.

The heater energizer 35 is configured to control energization of the heater 20 based on the control value determined by the control value determiner 34.

1-2. Process

Figure 4:
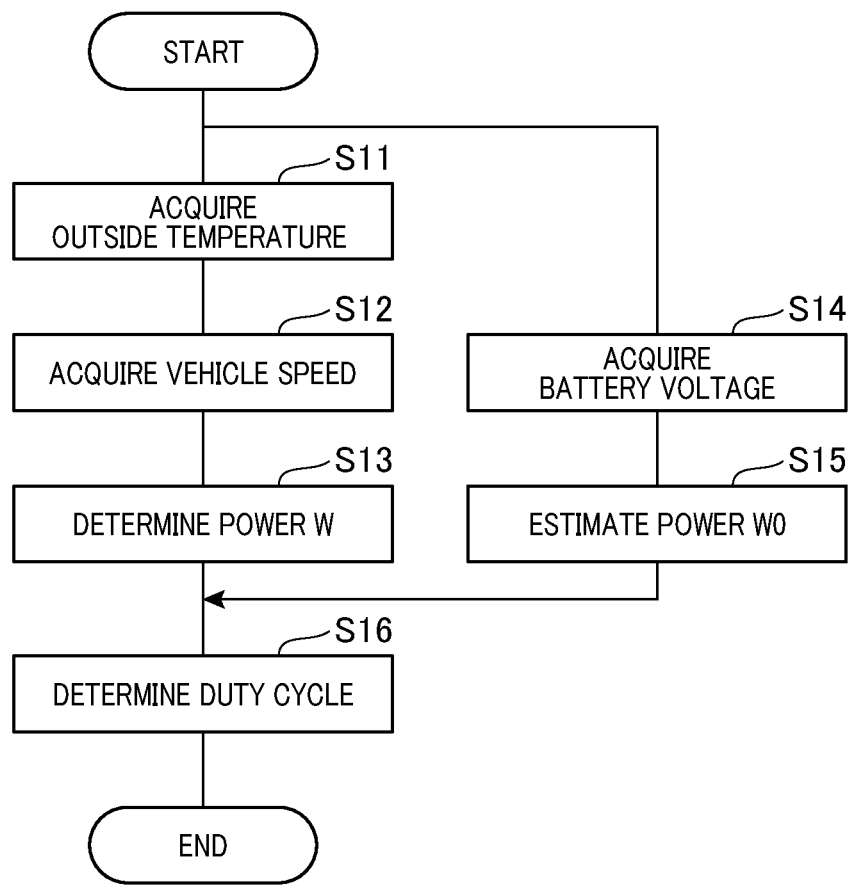
FIG. 4 is a flowchart of a determination process performed by a controller according to the first embodiment.

A determination process performed by the controller 30 will now be described with reference to the flowchart of FIG. 4. The determination process of FIG. 4 is repeatedly performed every predetermined time interval after an ignition switch of the vehicle is turned on.

At S11, the controller 30 acquires an outside temperature from the outside temperature sensor 41.

Subsequently, at S12, the controller 30 acquires a vehicle speed from the vehicle speed sensor 42.

Subsequently, at S13, the controller 30 determines power W[W] to be supplied to the heater 20 based on the acquired outside temperature and the acquired vehicle speed. The power W is target supply power to the heater 20. The target energization level determiner 32 is responsible for execution of S11 to S13.

The power W is calculated according to the following equation (1), which is set up from the heat-transfer coefficient h [W/(m²·K)], and a predetermined target surface temperature $T_1$ [K] of the heater 20 minus the outside temperature $T_0$ [K].

$$W = q \times A = h \times (T_1 - T_0) \times A \quad (1)$$

In the equation (1), q is a heat flux [W/m²] and A is a surface area [m²] of the heater 20.

The heat-transfer coefficient h is acquired using a Nusselt number Nu and a characteristic length L.

The Nusselt number Nu is a Nusselt number, assuming on-plate forced-convection which affects the top surface or the bottom surface of the case 110 with the LIDAR device 100 mounted on the vehicle.

Figure 5:
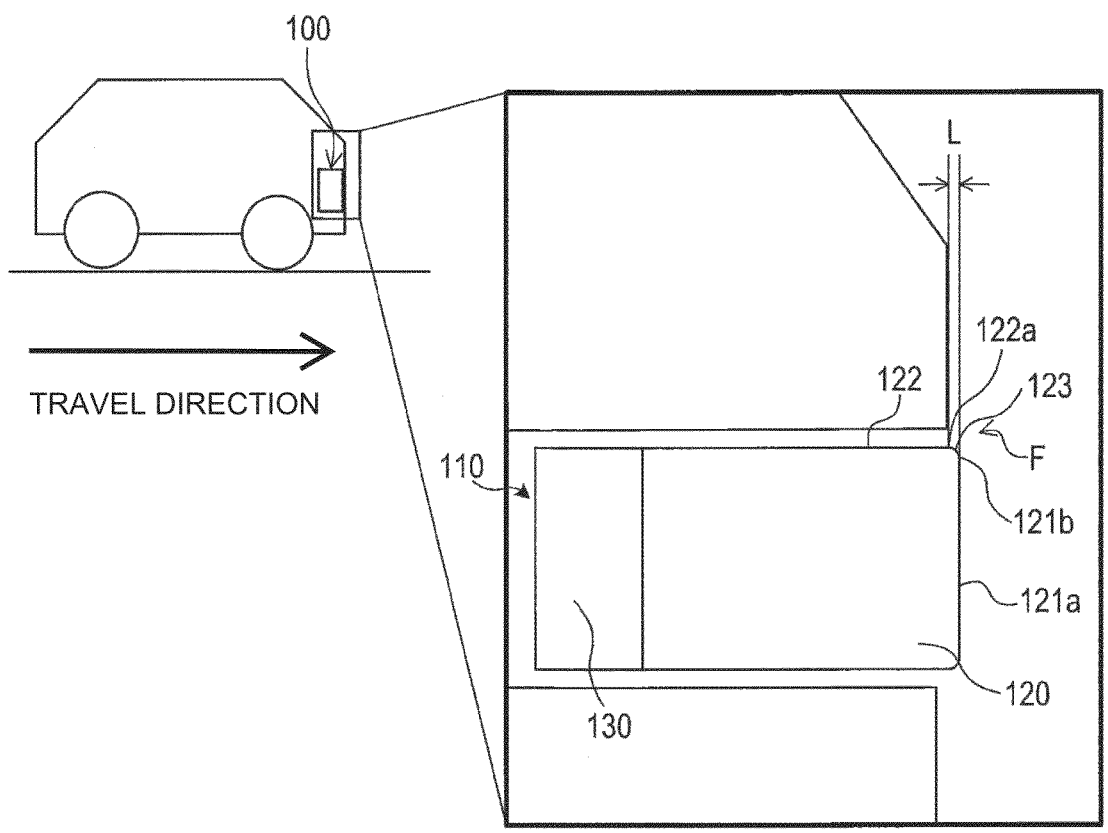
FIG. 5 is a cross-sectional view of the LIDAR device mounted to a vehicle.

The characteristic length L is a length along the travel direction of the vehicle, of at least a portion of the case 110 on the top or bottom surface of the case 110. The characteristic length L may be appropriately set within a length along the travel direction on the top or bottom surface of case 110. In the present embodiment, as illustrated in FIG. 5, the characteristic length L is, in a vertical cross section along the travel direction of the vehicle of the LIDAR device 100, a length along the travel direction of the vehicle, of a rounded portion 123 connecting the top surface 122 of the cover 120 which is a portion of the case 110 and the front surface 121a of the transmission window 121. More specifically, the characteristic length L is a length along the travel direction of the vehicle, of a portion of the case 110 from the upper edge 121b of the front surface 121a of the transmission window 121 to the front edge 122a of the top surface 122 of the cover 120, where the length along the travel direction gradually deceases in the travel direction. This rounded portion 123 is a portion of the cover 120 of the LIDAR device 100 that is most susceptible to influence of a flow F of air in contact with the front surface 121a of the transmission window 121 toward the bumper of the vehicle during travel of the vehicle.

More specifically, the heat-transfer coefficient h can be calculated according to the following equations (2) to (4).

$$h = Nu \times \lambda \div L \quad (2)$$

$$Nu = 0.037 \times Re^{4/5} \times P^{1/3} (Re > 3.2 \times 10^5) \quad (3)$$

$$Nu = 0.664 \times Re^{1/2} \times P^{1/3} (Re \leq 3.2 \times 10^5) \quad (4)$$

In the equations (2) to (4), $\lambda$ is the thermal conductivity of air [W/m·K], Re is the Reynolds number, and P is the Prandtl number. The Prandtl number is a ratio of the kinematic viscosity $v$ [m²/s] to the thermal diffusion coefficient of air $\alpha$ [m²/s]. The Reynolds number is calculated according to the following (5).

$$Re = U \times L \div v \quad (5)$$

In the above equation (5), U is a vehicle speed [m/s].

At S14, the controller 30 acquires a detected value of the battery voltage.

Subsequently, at S15, the controller 30 estimates power W0 that the battery 43 can supply, based on the acquired, detected value of the battery voltage. The available energization level estimator 33 is responsible for execution of S14 to S15.

Subsequently, at S16, the controller 30 determines a duty cycle based on the power W determined at S13 and the power W0 estimated at S15. Thereafter, the controller 30 terminates the determination process of FIG. 4. The control value determiner 34 is responsible for execution of S16.

Besides the determination process of FIG. 4, the controller 30 controls energization of the heater 20 based on the duty cycle determined in the determination process of FIG. 4. The heater energizer 35 is responsible for execution of this process.

1-3. Advantages

The first embodiment set forth above can provide the following advantages.

(1a) The controller 30 is configured to control energization of the heater 20 in response to the outside temperature and the vehicle speed, which enables appropriate control of energization of the heater 20.

(1b) The controller 30 is configured to control energization of the heater 20 based on a function of the outside temperature and the vehicle speed as parameters, which enables optimization of the energization level of the heater 20 and thus enables reduction of power consumption of the heater 20.

(1c) the controller 30 is configured to control energization of the heater 20 based on the detected battery voltage of the battery 43 as well, which enables reduction of variation of the actual energization level of the heater 20 with variation of the battery voltage.

2. SECOND EMBODIMENT 2-1. Differences from First Embodiment

A second embodiment is similar in basic configuration to the first embodiment. Thus, duplicate description regarding the common configuration will be omitted and differences from the first embodiment will be mainly described below.

In the first embodiment, the controller 30 controls energization of the heater 20 based on a function of the outside temperature and the vehicle speed as parameters. More specifically, at S13 of the determination process illustrated in FIG. 4, the controller 30 determines the power W to be supplied to the heater 20 based on the function of the outside temperature and the vehicle speed as parameters.

On the other hand, in the second embodiment, the controller 30 controls energization of the heater 20 based on a table in which an energization condition for the heater 20 is predefined depending on the outside temperature and the vehicle speed. More specifically, at S13 of the determination process illustrated in FIG. 4, the controller 30 determines the power W to be supplied to the heater 20 with reference to an example table illustrated in FIG. 6 that preliminarily associates the power W to be supplied to the heater 20 with the outside temperature and the vehicle speed. In the table illustrated in FIG. 6, the power W is set such that the lower the outside temperature, the higher the power W, and the higher the vehicle speed, the higher the power W.

2-2. Advantages

The second embodiment enables appropriate energization of the heater 20 in a relatively simple process as compared with the first embodiment.

3. THIRD EMBODIMENT 3-1. Differences from First Embodiment

A third embodiment is similar in basic configuration to the first embodiment. Thus, duplicate description regarding the common configuration will be omitted and differences from the first embodiment will be mainly described below.

Figure 7:
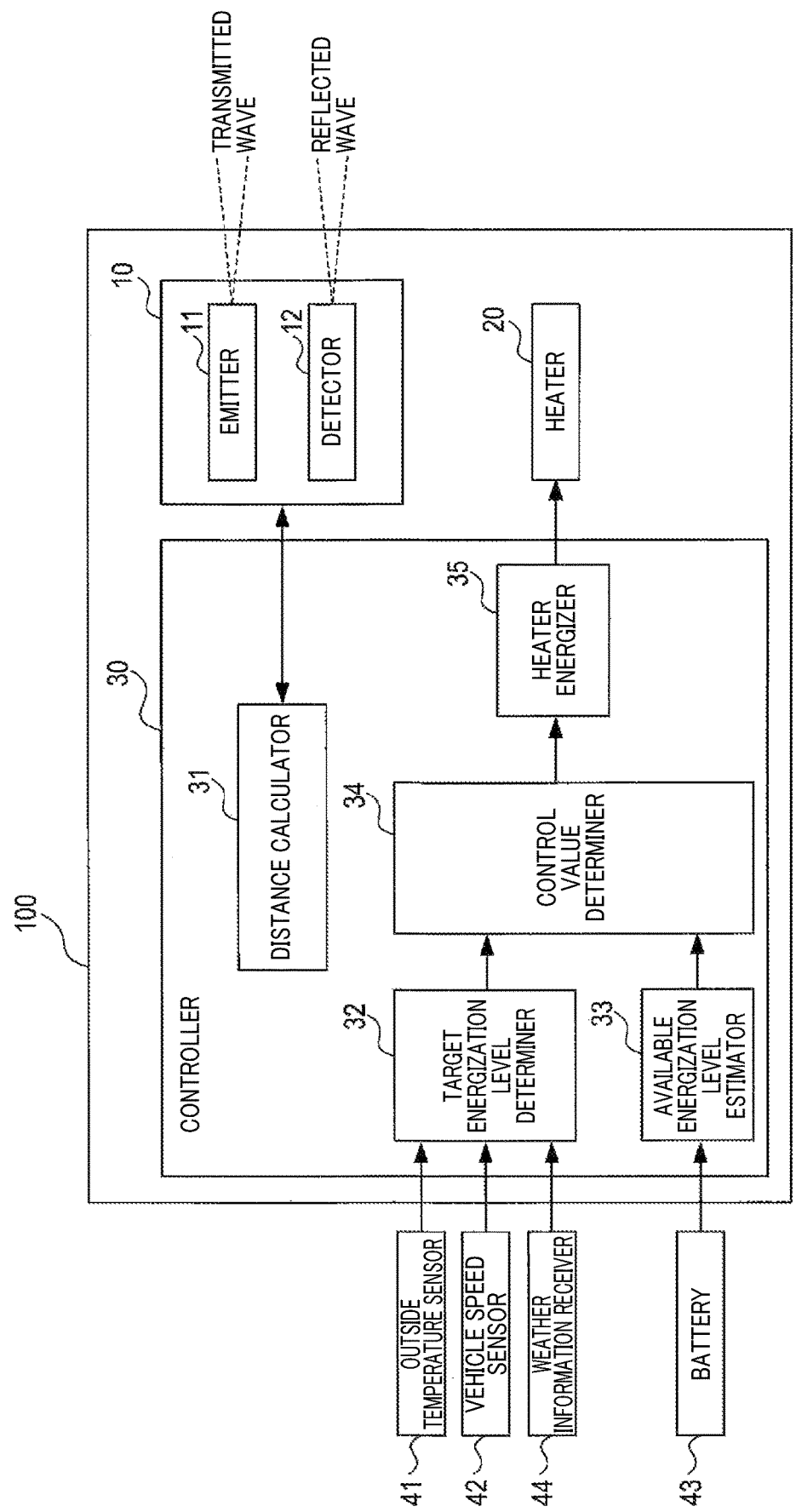
FIG. 7 is a block diagram of a LIDAR device according to a third embodiment.

The third embodiment is different from the first embodiment in that, as illustrated in FIG. 7, the controller 30 is configured to determine at least a snowfall condition around the vehicle based on weather information acquired from a weather information receiver 44, and control energization in response to not only the outside temperature and the vehicle speed, but also the snowfall condition. The weather information receiver 44 receives, from an external information communication system, such as Vehicle Information and Communication System (VICS), weather information in an area including at least a location where the vehicle is traveling. VICS is a registered trademark. The weather information received by the weather information receiver 44 includes information regarding the snowfall in the area. The controller 30 determines the snowfall condition around the vehicle based on the snowfall condition in the area, such as an amount of snowfall, in the weather information acquired from the weather information receiver 44.

3-2. Process

Figure 8:
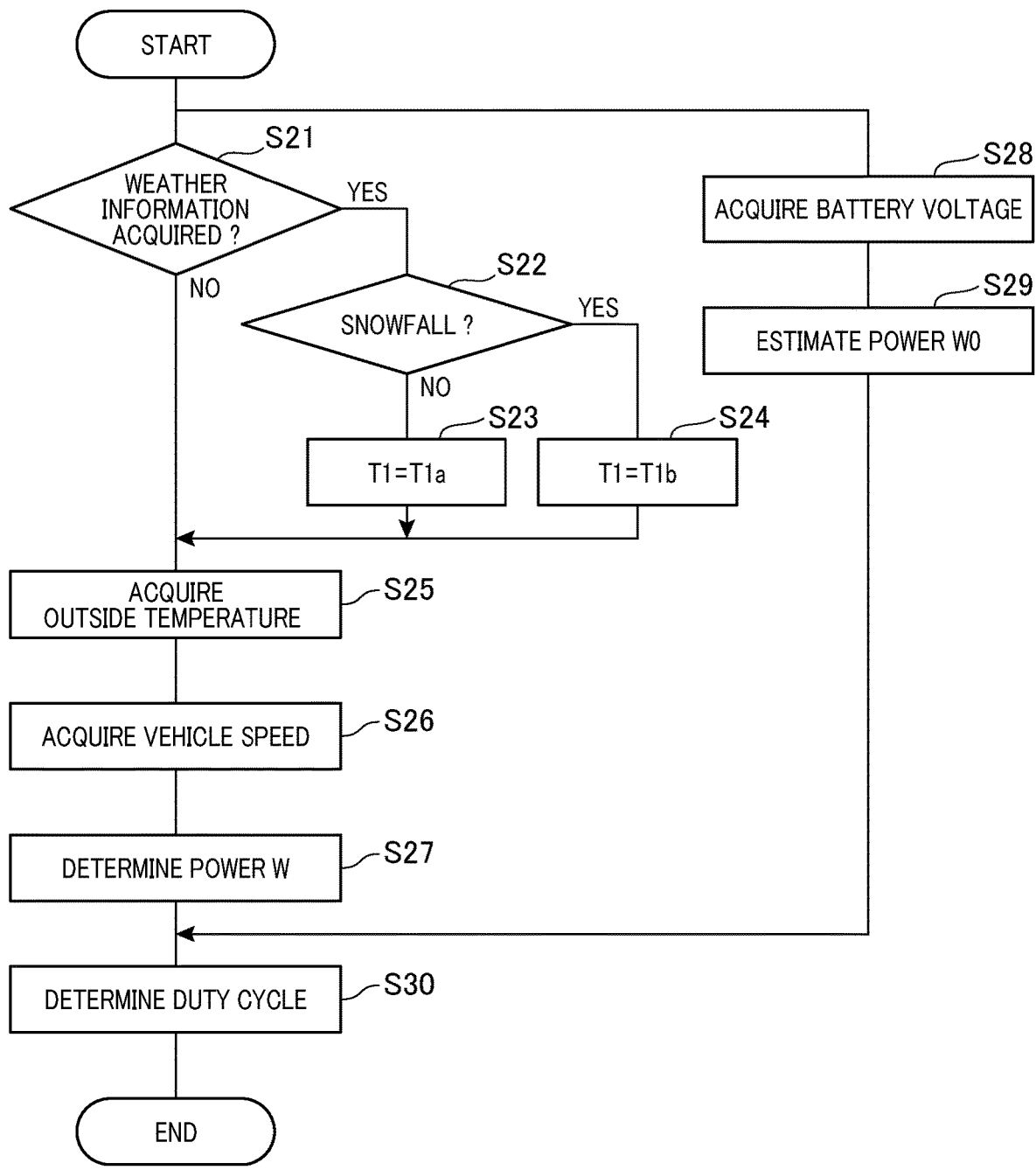
FIG. 8 is a flowchart of a determination process performed by a controller according to the third embodiment.

A determination process of the third embodiment performed by the controller 30 instead of the determination process of the first embodiment will now be described with reference to the flowchart of FIG. 8. The determination process of FIG. 8 is repeatedly performed every predetermined time interval after the ignition switch of the vehicle is turned on.

First, at S21, the controller 30 determines whether the weather information receiver 44 has acquired weather information in an area including a location where the vehicle is traveling.

If at S21 the controller 30 determines that the weather information receiver 44 has acquired the weather information at S21, it proceeds to S22 and determines whether there is snowfall in the area based on the weather information acquired by the weather information receiver 44.

If at S22 the controller 30 determines that there is no snowfall in the area, it proceeds to S23 and corrects the target surface temperature $T_1$ in the above equation (1) to a target surface temperature $T_{1a}$ under normal conditions where there is no snowfall, and then proceeds to S25.

On the other hand, if at S22 the controller 30 determines that there is snowfall, the controller 30 proceeds to S24. At S24, the controller 30 corrects the target surface temperature $T_1$ to a target surface temperature $T_{1b}$ under snowfall conditions, and then proceeds to S25. The target surface temperature $T_{1b}$ under snowfall conditions is higher than the target surface temperature $T_{1a}$ under normal conditions such that the target surface temperature $T_{1b}$ under snowfall conditions increases as the amount of snowfall increases. The controller 30 corrects the target surface temperature $T_1$ in response to the amount of snowfall included in the information acquired by the weather information receiver 44. This is because, during snowfall, heat of the transmission window 121 is easily taken away by snow, so it is necessary to increase the energization level of the heater 20 as compared with under normal conditions where there is no snowfall. This is also because, even during snowfall, it is necessary to increase the energization level as the amount of snowfall increases.

On the other hand, if at S21 the controller 30 determines that the weather information receiver 44 has not acquired the weather information, it proceeds to S25. In this case, the current value of the target surface temperature $T_1$ is kept unchanged.

Subsequently, at S25, the controller 30 acquires an outside temperature from the outside temperature sensor 41.

Subsequent S26, S27, and S30 are the same as S12, S13 and S16 of the first embodiment, and S28 and S29 performed by the controller 30 on another route than the route of S21 to S27 are the same as S14 and S15 of the first embodiment. Thereafter, the controller 30 terminates the determination process of FIG. 8. The target energization level determiner 32 is responsible for execution of S21 to S27. The available energization level estimator 33 is responsible for execution of S28 to S29. The control value determiner 34 is responsible for execution of S30.

3-3. Advantages

The third embodiment set forth above in detail can provide the following advantages in addition to the advantages of the first embodiment.

(3a) In the third embodiment, the controller 30 determines at least a snowfall condition around the vehicle based on weather information acquired from the weather information receiver 44, and controls energization in response to not only the outside temperature and the vehicle speed, but also the snowfall condition. This enables appropriate energization of the heater 20 in response to the snowfall condition.

(3b) More specifically, the controller 30 controls energization of the heater 20 such that the energization level under snowfall conditions is higher than the energization level under normal conditions where there is no snowfall. Therefore, snow adhering to the transmission window 121 can be rapidly melted even during snowfall, which can mitigate the reduction in measurement accuracy of the LIDAR device 100.

(3c) The controller 30 controls the energization level of the heater 20 in response to the snowfall condition, such as an amount of snowfall or the like. This enables energization of the heater 20 at an appropriate energization level to the snowfall condition.

4. FOURTH EMBODIMENT

A fourth embodiment is similar in basic configuration to the third embodiment. Thus, duplicate description regarding the common configuration will be omitted and differences from the third embodiment will be mainly described below.

Figure 9:
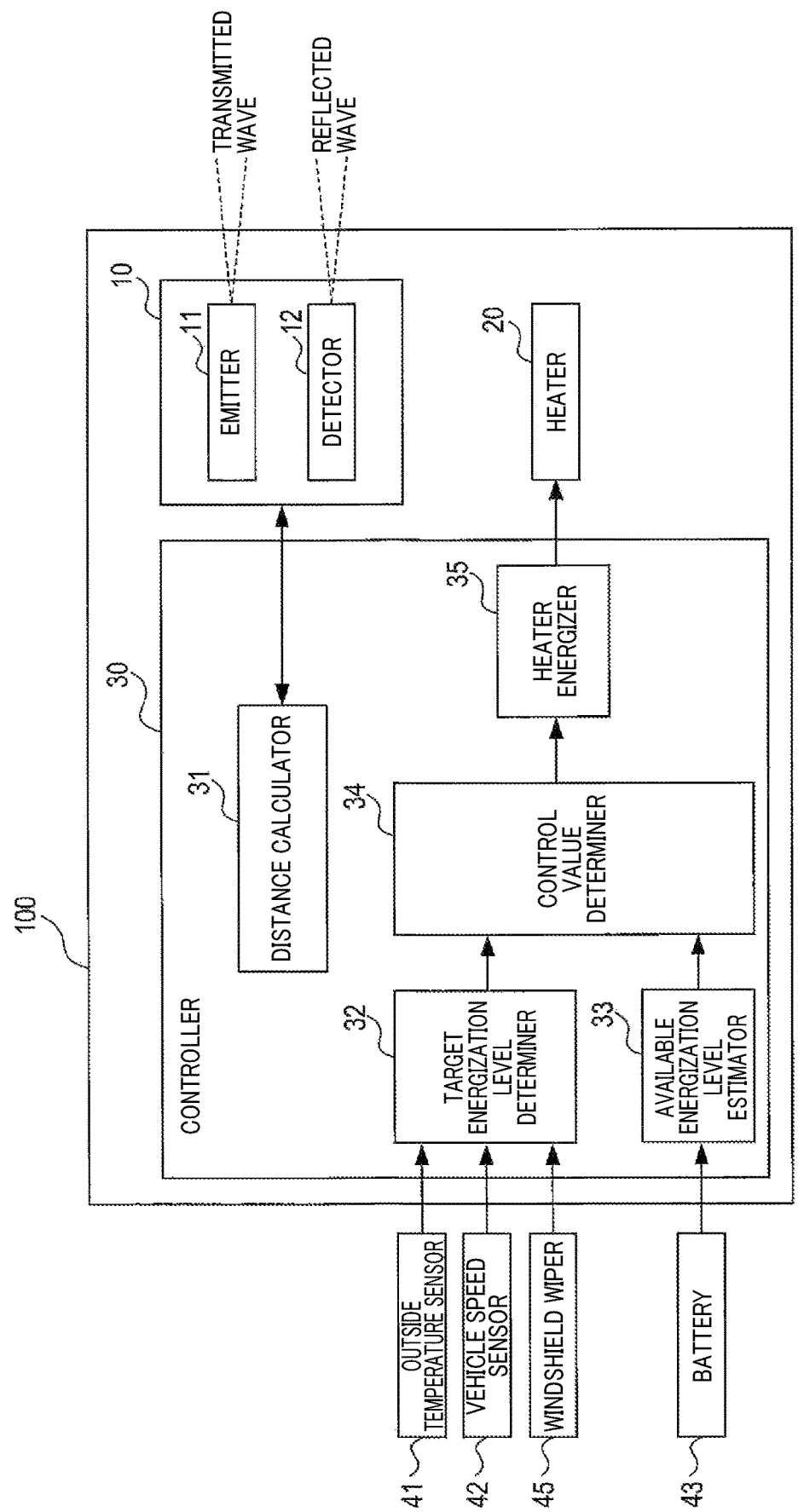
FIG. 9 is a block diagram of a LIDAR device according to a fourth embodiment.

In the third embodiment, the controller 30 determines the snowfall condition based on the weather information acquired from the weather information receiver 44. On the other hand, in the fourth embodiment, the controller 30 determines the snowfall condition based on the outside temperature and an operating state of a windshield wiper 45 as illustrated in FIG. 9. More specifically, when the outside temperature is below a predetermined temperature and the windshield wiper 45 is in operation, the controller 30 determines that there is snowfall.

In addition, the controller 30 controls the energization level of the heater 20 in response to an operating state of the windshield wiper 45. A wiping speed at which the windshield wiper 45 wipes the transmission window 121 can be variably set in multiple levels. When the windshield wiper 45 is operating at a high wiping speed level, it is considered that the amount of snowfall is high. Thus, the controller 30 controls energization of the heater 20 such that the higher the wiping speed of the windshield wiper 45, the higher the energization level of the heater 20.

The determination process of the fourth embodiment performed by the controller 30 instead of the determination process of FIG. 8 of the third embodiment is similar to the determination process of the third embodiment except in the following. More specifically, the controller 30 skips S21 and begins the process with S22. In S22, as described above, based on the outside temperature and the operating state of the windshield wiper 45, the controller 30 determines whether there is snowfall around the vehicle. In S24, the controller 30 corrects the target surface temperature $T_1$ to the target surface temperature $T_{1b}$ under snowfall conditions in response to the wiping speed level of the windshield wiper 45.

The fourth embodiment can provide similar advantages as in the third embodiment.

5. FIFTH EMBODIMENT

A fifth embodiment is similar in basic configuration to the third embodiment. Thus, duplicate description regarding the common configuration will be omitted and differences from the third embodiment will be mainly described below.

Figure 10:
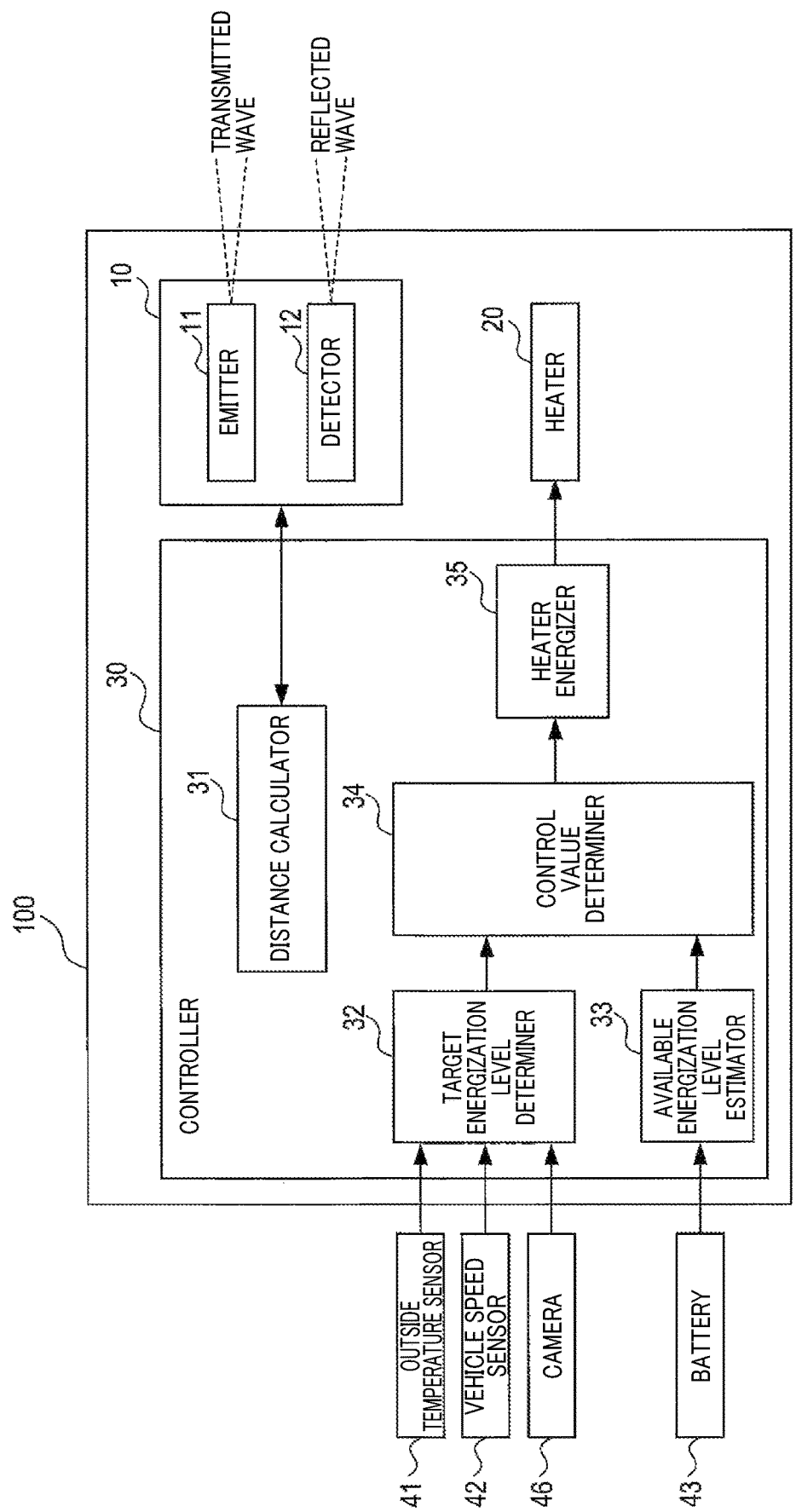
FIG. 10 is a block diagram of a LIDAR device according to a fifth embodiment.

In the third embodiment, the controller 30 determines the snowfall condition based on the weather information acquired from the weather information receiver 44. On the other hand, in the fifth embodiment, as illustrated in FIG. 10, the controller 30 determines the snowfall condition based on a result of analysis of images of the surroundings of the vehicle captured by the camera 46 mounted to the vehicle.

The camera 46 is attached to the front inside of the vehicle. The camera 46 repeatedly captures images of an area ahead of the vehicle every predetermined time interval and outputs data of the captured images to a vehicle-mounted ECU (not shown). The vehicle-mounted ECU detects snow from the images captured by the camera 46 and analyzes a snowfall condition, such as an amount of snowfall, in the surroundings ahead of the vehicle. The controller 30 acquires a result of analysis by the vehicle-mounted ECU and performs the process based on the acquired result of analysis.

The determination process of the fifth embodiment performed by the controller 30 instead of the determination process of FIG. 8 of the third embodiment is similar to the determination process of the third embodiment except in the following. More specifically, the controller 30 skips S21 and begins the process with S22. At S22, as described above, based on a result of analysis of images captured by the camera 46 mounted to the vehicle, the controller 30 determines whether there is snowfall in the surroundings ahead of the vehicle. At S24, the controller 30 corrects the target surface temperature $T_1$ to the target surface temperature $T_{1b}$ under snowfall conditions in response to the amount of snowfall acquired from the images captured by the camera 46.

The fifth embodiment can provide similar advantages as in the third embodiment.

6. OTHER EMBODIMENTS

Specific embodiments of the present disclosure have been described above, but the present disclosure may be implemented in various embodiments without being limited to the above embodiments.

(6a) In the above first embodiment, a length along the travel direction of the vehicle, of a portion of the case 110 connecting the front surface 121a of the transmission window 121 and the top surface 122 of the cover 120, is used as the characteristic length L when determining the heat-transfer coefficient h, but is not limited thereto. That is, the characteristic length L, as long as it is a length along the travel direction of the vehicle, of at least a portion of the case 110 on the top or bottom surface of the case 110, may be selected to be a length of an appropriate portion of the case 110 to the shape or the like of the LIDAR device 100. More specifically, for example, as it is not desirable that the light transmitted by the LIDAR device 100 is blocked, the LIDAR device 100 may be mounted to the vehicle so as to protrude from the bumper of the vehicle. In such a vehicle, the characteristic length L may be a length along the travel direction of the vehicle, of a portion of the top surface or the bottom surface of the LIDAR device 100, particularly, the top surface of the LIDAR device 100, which protrudes from the bumper of the vehicle. This is because the portion of the LIDAR device 100 that protrudes from the vehicle is also considered to be susceptible to air flow that the traveling vehicle receives. Then, in cases where the length along the travel direction of the vehicle, of the portion of the LIDAR device 100 protruding from the vehicle, changes in the lateral direction of the vehicle, a maximum of the length may be used as the characteristic length L.

(6b) In each of the above embodiments, whether or not there is snowfall, the controller 30 controls energization of the heater 20 beforehand in response to the vehicle speed and the outside temperature. That is, the controller 30 may activate the heater 20 even if there is no snowfall. This is because it may be difficult to instantly heat the heater 20 if the outside temperature is too low when snow begins to fall. Thus, it is preferable to, whether or not there is snowfall, operate the heater 20 beforehand at an appropriate energization level.

On the other hand, from the viewpoint of suppressing power consumption, for example, the controller 30 may activate the heater 20 when determining that there is snowfall at least around the vehicle. Further, the controller 30 may activate the heater 20 only when determining that there is snowfall at least around the vehicle.

(6c) In the above embodiments, the controller 30 controls energization of the heater 20 in response to not only the outside temperature and the vehicle speed, but also the battery voltage. Alternatively, the controller 30 may control energization to the heater 20 without taking into account the battery voltage.

(6d) In the above third embodiment, as in the first embodiment, the controller 30 controls energization of the heater 20 based on the function of the outside temperature and the vehicle speed as parameters. Alternatively, as in the second embodiment, the controller 30 may control energization of the heater 20 based on a table in which an energization condition is pre-defined depending on the outside temperature and the vehicle speed.

More specifically, for example, two types of tables, in each of which an energization condition is pre-defined, may be prepared: one under snowfall conditions and the other under normal conditions where there is no snowfall. Numerical values in the table under snowfall conditions are set such that the energization level of the heater 20 is higher than under normal conditions. In response to determining that there is snowfall, the controller 30 acquires the energization condition with reference to the table under snowfall conditions. On the other hand, in response to determining that there is no snowfall, the controller 30 acquires the energization condition with reference to the table under normal conditions.

This also applies to the fourth and fifth embodiments.

(6e) The outside temperature used to determine the target energization level may be corrected based on a result of detection by a solar radiation sensor provided on a bottom of the vehicle carrying the LIDAR device 100, or an on/off state of vehicle lights. Since the outside temperature sensor 41 is normally provided at a position away from the LIDAR device 100, the outside temperature around the LIDAR device 100 and the outside temperature detected by the outside temperature sensor 41 may be different. More specifically, for example, in cases where the outside temperature sensor 41 is provided on the bottom of the vehicle where it is less susceptible to the sun, the outside temperature around the LIDAR device 100 may be higher than the temperature detected by the outside temperature sensor 41. Therefore, in response to a result of detection by the solar radiation sensor, the outside temperature used to determine the target energization level may be corrected to be higher than the outside temperature detected by the outside temperature sensor 41. In addition, when the vehicle lights are off, that is, during daylight hours, the outside temperature used to determine the target energization level may be corrected to be higher than the outside temperature detected by the outside temperature sensor 41 in response to the on/off state of the lights.

(6f) The outside temperature used to determine the target energization level may be corrected based on information regarding a road on which the vehicle is traveling. More specifically, for example, in cold climates, a temperature inside a tunnel is high as compared with a temperature outside the tunnel and the outside temperature drops at once upon exit from the tunnel. Thus, the transmission window 121 may not be heated sufficiently by the heater 20 and snow adhering to the transmission window 121 may not be melted quickly. Therefore, the controller 30 may be configured to, even during travel in a tunnel, determine the target energization level based on the outside temperature before the vehicle enters the tunnel.

(6g) The controller 30 may control the target energization level to be higher than the target energization level determined from the current vehicle speed if the vehicle speed is expected to increase rapidly. This is because it is intended to increase the energization level of the heater 20 beforehand taking into account that it takes time for the temperature of the heater 20 to rise. Specifically, the vehicle speed used to determine the target energization level may be an arrival vehicle speed estimated from the acceleration of the vehicle. In cases where the acceleration of the vehicle is equal to or higher than a predetermined value, the controller 30 may correct the target energization level to be higher than the target energization level determined based on the current speed. The acceleration of the vehicle can be acquired from an acceleration sensor of the vehicle. Furthermore, the target energization level may be corrected based on information regarding the road on which the vehicle will travel. More specifically, for example, since the vehicle traveling on an expressway is expected to reach a high speed, the controller 30 may correct the target energization level of the heater 20 to a high level when entering the expressway.

(6h) In the above third embodiment, the controller 30 may further be configured to determine whether there is contamination on the transmission window 121, based on a result of detection by a contamination sensor provided on the transmission window 121. If it is determined that there is no contamination on the transmission window 121, then the heater 20 may not be activated. Even if the acquired weather information indicates that there is snowfall, there may be no snowfall in an area where the vehicle is actually traveling. If nothing is detected by the contamination sensor, there is no snow adhering to the transmission window 121, and it may be considered that there is no snowfall around the vehicle. Therefore, if the controller 30 determines that there is no contamination, it may not activate the heater 20 regardless of contents of the weather information. The contamination sensor is usually used to drive a cleaning device, such as a washer, when contamination is detected.

(6i) In the above embodiments, the LIDAR device is an example of the ranging device, but the type of the ranging device is not limited to this type. More specifically, the ranging device includes, for example, a millimeter-wave radar device or an ultrasonic sensor device.

(6j) In the above embodiments, the LIDAR device 100 is mounted on the front side of the vehicle, but the mounting position of the LIDAR device 100 on the vehicle is not limited to this position. More specifically, for example, the LIDAR device 100 may be mounted around the vehicle, such as on the left side, the right side, or the rear side of the vehicle.

(6k) In the above embodiments, the transmission window 121 is a window that transmits both the transmitted waves and the reflected waves. Alternatively, the transmission window 121 may be configured such that at least either of the transmitted waves and the reflected waves are transmitted. In addition, in the above embodiments, the transmission window 121 is transparent such that light, as transmitted waves, can be transmitted. Alternatively, the transmission window 121 does not need to be transparent if it transmits the transmitted waves. The transmission window 121 can be made of various materials depending on the type of transmitted waves.

(6l) The functions of a single component may be distributed to a plurality of components, or the functions of a plurality of components may be consolidated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments.

(6m) Besides the LIDAR device 100 described above, the present disclosure may be implemented in various modes, such as the controller 30 as a constituent element of the LIDAR device 100, a program for causing a computer to serve as the controller 30, a storage medium storing this program, and a method for controlling energization of the heater 20 in the LIDAR device 100.

What is claimed is:

1. A ranging device for a vehicle, configured to emit a transmitted wave and detect a reflected wave from an object illuminated by the transmitted wave, thereby measuring a distance to the object, the ranging device comprising:
   a transmission window through which the transmitted wave and the reflected wave are transmitted;
   a heater configured to heat the transmission window, the heater comprising a transparent conductive film disposed on the transmission window, the transparent conductive film generating heat that heats the transmission window from a supply of power that is electrically connected to the transparent conductive film; and
   a controller configured to vary the supply of power to the transparent conductive film based on (i) an outside temperature that is a temperature outside the ranging device and (ii) a speed of the vehicle, wherein
   the transparent conductive film comprises a film capable of transmitting the transmitted wave and the reflected wave for object detection while the supply of power to the transparent conductive film varies,
   the supply of power to the transparent conductive film increases with increasing speed of the vehicle, and
   increasing the supply of power to the transparent conductive film increases heat generated by the transparent conductive film that heats the transmission window.

2. The ranging device according to claim 1, wherein the controller is configured to control energization of the heater based on a function of the outside temperature and the speed of the vehicle as parameters.

3. The ranging device according to claim 2, wherein the ranging device comprises a case including, as a portion, the transmission window, and the function is set up based on a heat-transfer coefficient calculated using a Nusselt number assuming on-plate forced-convection which affects a top surface or a bottom surface of the case with the ranging device mounted on the vehicle, and a characteristic length that is a length along a travel direction of the vehicle, of at least a portion of the case on the top surface or the bottom surface of the case.

4. The ranging device according to claim 1, wherein the controller is configured to control energization of the heater based on a table in which an energization condition for the heater is predefined in response to the outside temperature and the speed of the vehicle.

5. The ranging device according to claim 1, wherein the controller is configured to control energization of the heater further in response to a detected battery voltage of a battery mounted to the vehicle.

6. The ranging device according to claim 1, wherein the controller is configured to determine at least a snowfall condition around the vehicle and control energization of the heater further in response to the snowfall condition.

7. The ranging device according to claim 1, wherein the transparent conductive film comprises an indium tin oxide (ITO) film.

8. A ranging device for a vehicle configured to emit a transmitted wave and detect a reflected wave from an object illuminated by the transmitted wave, thereby measuring a distance to the object, the ranging device comprising:

a transmission window through which the transmitted wave and the reflected wave are transmitted;

a heater configured to heat the transmission window, the heater comprising a transparent conductive film disposed on the transmission window, the transparent conductive film generating heat that heats the transmission window from a supply of power that is electrically connected to the transparent conductive film; and a controller configured to vary the supply of power to the transparent conductive film, wherein the transparent conductive film comprises a film capable of transmitting the transmitted wave and the reflected wave for object detection while the supply of power to the transparent conductive film varies.

* * * * *